United States Patent
Ely

(10) Patent No.: US 6,700,765 B2
(45) Date of Patent: Mar. 2, 2004

(54) HIGH CURRENT SERIES-PASS OVER-VOLTAGE PROTECTION CIRCUIT

(75) Inventor: Jeffrey A. Ely, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 75 days.

(21) Appl. No.: 10/159,996

(22) Filed: May 31, 2002

(65) Prior Publication Data

US 2003/0223170 A1 Dec. 4, 2003

(51) Int. Cl.$^7$ ................................................ H02H 3/20
(52) U.S. Cl. ...................... 361/91.1; 323/284; 257/355
(58) Field of Search ................... 361/91.1; 323/284; 257/355

(56) References Cited

U.S. PATENT DOCUMENTS 5,585,991 A * 12/1996 Williams ..................... 361/30

* cited by examiner

Primary Examiner—Stephen W. Jackson
Assistant Examiner—James Demakis
(74) Attorney, Agent, or Firm—Jimmy L. Funke; Stefan V. Chmielewski

(57) ABSTRACT

An improved series-pass over-voltage protection circuit includes at least one N-channel enhancement mode MOS-FET (NFET) coupling a DC voltage supply such as a motor vehicle storage battery to one or more high current electrical loads. The drain of the NFET is connected to the positive terminal of the DC voltage supply, and a high impedance gate voltage power supply biases the NFET to a fully enhanced state in normal operation to provide very low pass-through on-resistance. A gate discharge circuit including a high current capability transistor connected between the NFET gate and ground potential is activated in response to a detected over-voltage condition, and a compensation network having low AC impedance relative to that of the NFET is connected in parallel with the gate discharge circuit, providing a sink for the NFET gate charge to limit over-voltage shoot-through while the gate discharge transistor is activated in response to the detected over-voltage condition to quickly discharge the gate capacitance and transition the NFET to a limited conduction mode for regulating the load voltage.

7 Claims, 2 Drawing Sheets

HIGH CURRENT SERIES-PASS OVER-VOLTAGE PROTECTION CIRCUIT

TECHNICAL FIELD

This invention relates to a series-pass circuit for coupling a DC voltage supply subject to over-voltage transients to a high current electrical load.

BACKGROUND OF THE INVENTION

In a motor vehicle electrical system, over-voltage protection circuitry is needed to protect electrical loads from damage due to over-voltages that can occur during jump-starting and load-dump conditions. Although passive shunt suppression devices such as Zener diodes or MOVs can be used in certain applications, the transient over-voltage energy can be too high to clamp with shunt devices, particularly in heavy duty vehicle applications. Although it is possible to use a series-pass suppression device such as a linear transistor instead of a shunt device, conflicting design requirements typically rule out the series-pass approach. Specifically, the series-pass suppression device must exhibit very low on-resistanice during normal operation, while exhibiting fast response to transient over-voltages to prevent over-voltage shoot-through to the electrical load. Accordingly, what is needed is a series-pass over-voltage suppression circuit that exhibits low on-resistance during normal pass-through operation, and that has the ability to quickly transition to a limited conduction mode in response to a detected over-voltage.

SUMMARY OF THE PRESENT INVENTION

The present invention is directed to an improved series-pass over-voltage protection circuit including at least one N-channel enhancement mode MOSFET (NFET) coupling a DC voltage supply such as a motor vehicle storage battery to one or more high current electrical loads. The drain of the NFET is connected to the positive terminal of the DC voltage supply, and a high impedance gate voltage power supply biases the NFET to a fully enhanced state in normal operation to provide very low pass-through on-resistance. A gate discharge circuit including a high current capability transistor connected between the NFET gate and ground potential is activated in response to a detected over-voltage condition, and a compensation network having low AC impedance relative to that of the NFET is connected in parallel with the gate discharge circuit, providing a sink for the NFET gate charge to limit overvoltage shoot-through while the gate discharge transistor is activated in response to the detected over-voltage condition to quickly discharge the gate capacitance and transition the NFET to a limited conduction mode for regulating the load voltage.

DESCRIPTION OF THE PREFERRED EMBODIMENT

Figure 1:
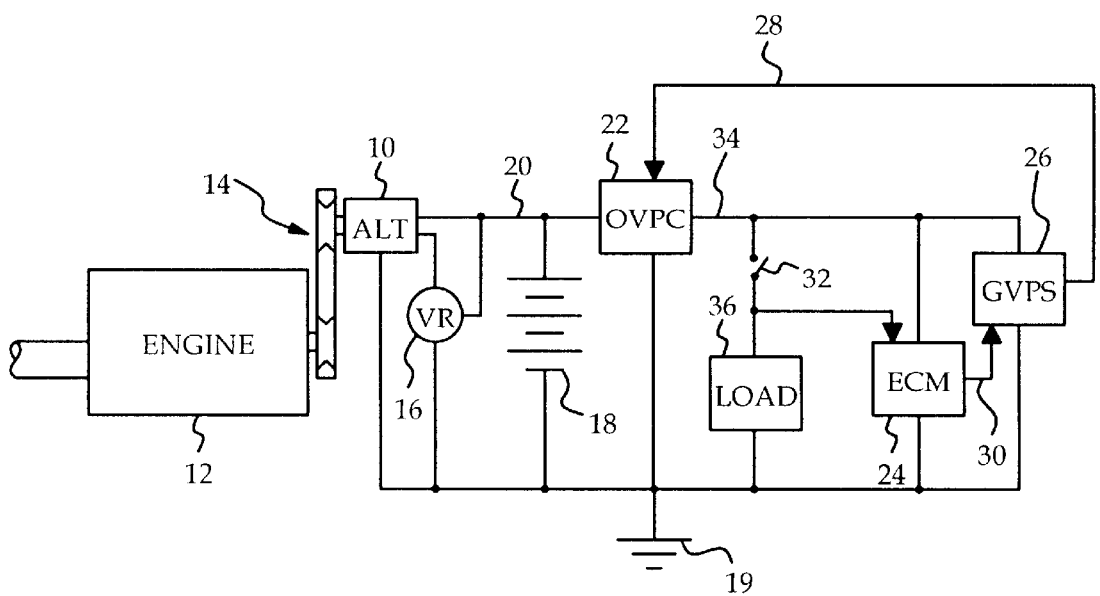
FIG. 1 is a circuit diagram of a motor vehicle electrical system including a series-pass over-voltage protection circuit according to this invention.

Referring to FIG. 1, the over-voltage protection circuit of the present invention is disclosed in the context of a conventional motor vehicle electrical system including a 24V storage battery 18 and one or more high current electrical loads 36 that draw operating current through a vehicle ignition switch 32. However, it will be recognized that the over-voltage protection circuit of this invention can also be used in other applications involving a DC power supply subject to over-voltage transients.

In the illustrated electrical system, an engine 12 drives an alternator (ALT) 10 via a belt and pulley arrangement 14, and a voltage regulator 16 controls the alternator field winding excitation during operation of the engine 12 to regulate the voltage on line 20 to a nominal reference voltage such as 27V. The alternator 10 and storage battery 18 are referenced to ground potential 19, and arc coupled via line 20 and the over-voltage protection circuit (OVPC) 22 of this invention to output line 34. At least one high-current electrical load 36 is coupled to line 34 via ignition switch 32, while various other loads such as engine control module (ECM) 24 and gate voltage power supply (GVPS) 26 are directly coupled to line 34. As explained below, GVPS 26 develops an elevated gate drive voltage for OVPC 22 on line 28 when activated by ECM 24 via line 30.

As mentioned above, voltages significantly in excess of the normal output voltage of alternator 10 can be produced on line 20 during jump-startinlg and during alternator load dump events. In heavy-duty environments, typical jump-start voltages may be as high as 80V, particularly in cases where the jump-voltage is obtained from an engine-driven welding generator. Load dump events occur during engine operation when the storage battery 18 becomes disconnected from line 20 due to a loose battery cable or an intermittent internal battery connection, for example. In this case, the alternator output voltage on line 20 can rise well above the nominal reference voltage before voltage regulator 16 can scale back the alternator field winding excitation. If the excessive voltage in either situation were passed on to line 34, the electrical loads 24, 26, 36 could easily be damaged unless they were individually protected from over-voltage (which is typically cost-prohibitive). Thus, the primary function of OVPC 22 is to limit the output voltage on line 34 to a voltage that will not damage the loads 24, 26, 36. However, since OVPC 22 achieves this function with a series-pass suppression device connected between input line 20 and output line 34, it is critical that the series on-resistance of OVPC 22 be as small as possible when supplying power to the high current electrical load 36.

Figure 2:
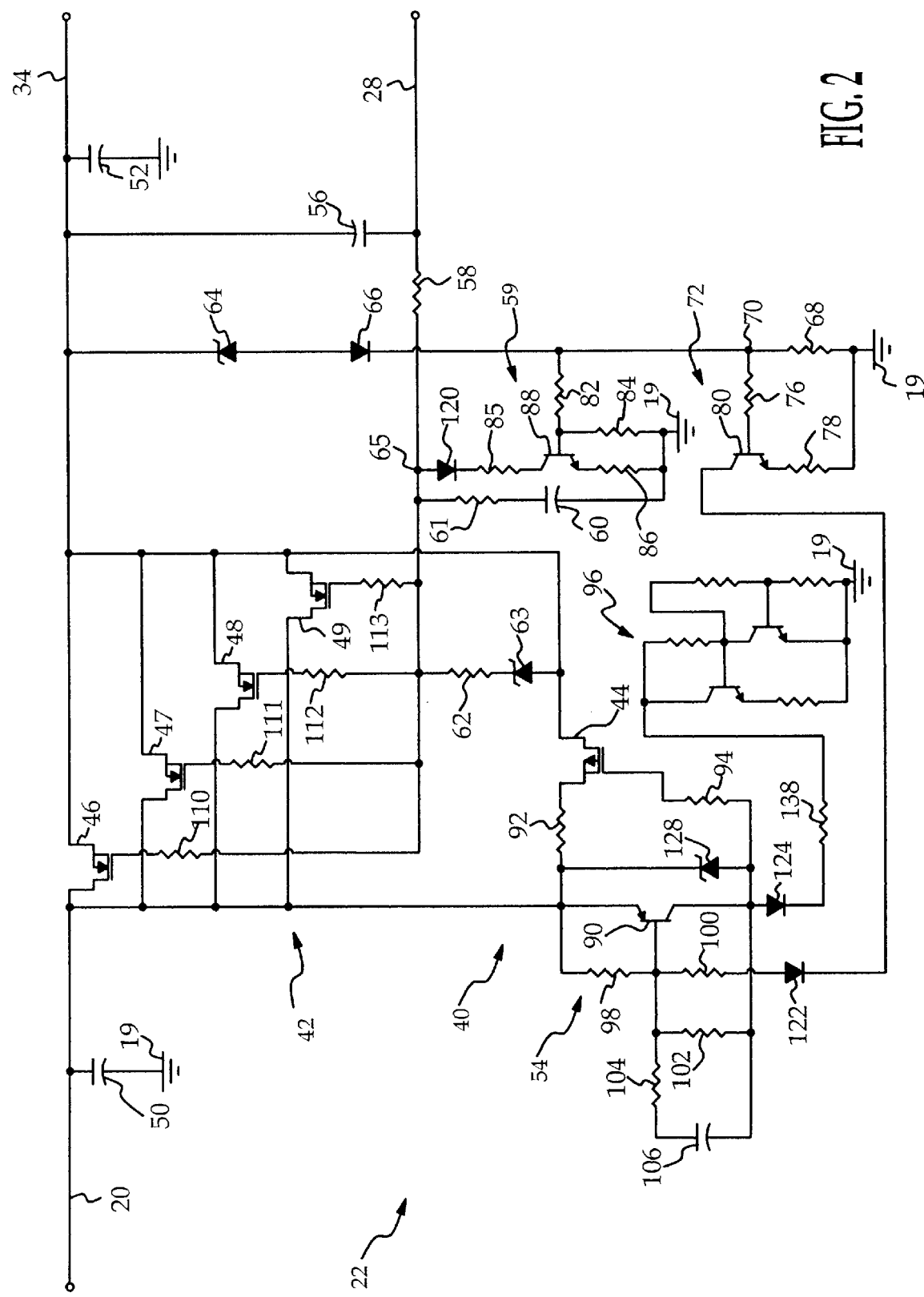
FIG. 2 is a circuit diagram of the series-pass over-voltage protection circuit of FIG. 1.

In general, and referring to FIG. 2, the above-described functionality of OVPC 22 is carried out with a high current power path 42 comprising a set of parallel-connected N-channel MOSFETs (NFETs) 46, 47, 48, 49 (or alternatively, a single NFET), each having its drain terminal connected to input line 20 and its source terminal connected to output line 34. Input capacitive filtering is provided by the capacitor 50, and output capacitive filtering is provided by the capacitor 52. The gate terminals of NFETs 46, 47, 48, 49 are connected via respective gate resistors 110, 111, 112, 113 and resistor 58 to the output line 28 of GVPS 26, and in the illustrated embodiment, GVPS 26 is activated to bias NFETs 46–49 to the fully enhanced state whenever ignition switch 32 is closed. The capacitor 56 filters the DC output voltage of GVPS on line 28, and the resistor 58 provides a source impedance that cooperates with an over-voltage regulation circuit 59 to regulate the conduction of NFETs 46–49 during over-voltage conditions, as explained below. The zener diode 63 provides gate over-voltage protection for the NFETs 46–49, and the resistor 62 limits the current supplied to over-voltage regulation circuit 59 through zener diode 63 during over-voltage suppression. Finally, and importantly, the serially connected capacitor 60 and resistor 61 form a low AC impedance compensation network that facilitates fast transition of the NFETs 46–49 from the fully enhanced mode to the controlled conduction or linear mode to minimize over-voltage shoot-through on input over-voltage transients due to jump-starting and/or alternator load dumping.

The over-voltage regulation circuit 59 includes a resistor 68 coupled in series with Zener diode 64 and reverse voltage protection diode 66 between output line 34 and ground 19, so that a control voltage is developed at node 70 whenever the output voltage exceeds the breakdown voltage of Zener diode 64 (which may be 30V, for example). The voltage at node 70 is divided by the resistors 82 and 84, and applied to the base of a high current capability gate discharge transistor 88, and the emitter-collector circuit of transistor 88 couples the junction 65 between gate resistors 110–113 and resistor 58 to ground 19 through reverse voltage protection diode 120 and resistors 85 and 86. Thus, the over-voltage regulation circuit 59 sinks current in relation to the degree to which the output voltage on line 34 exceeds the breakdown voltage of Zener diode 64 and the forward voltage drop of diode 66.

In the above-described circuit, the passive compensation network of capacitor 60 and resistor 61 serve two purposes: (1) establishing a pole-zero pair for stability enhancement of tile over-voltage control circuit 59 during over-voltage suppression, and (2) establishing a low AC impedance between ground 19 and the gate terminals of NFETs 46–49 for sinking gate charge during input voltage transients. While such pole-zero stability enhancement is commonly utilized in linear control circuits, the usual approach is to use a low capacitance value combined with a relatively high resistance value in order to reduce component size and cost. According to the present invention, however, a much higher value of capacitance is chosen for the capacitor 60 (such as 0.1 $\mu$F instead of 0.01 $\mu$F), along with a correspondingly lower resistance value for resistor 61, so that capacitor 60 presents an AC impedance that is much lower than the intrinsic gate-to-source and gate-to-drain capacitances of NFETs 46–49. In other words, there is a capacitive divider effect, and high frequency voltage transients on input line 20 and/or output line 34 do not produce a corresponding voltage increase at the NFET gate terminals. Also, the gate drive voltage on line 28 developed by GVPS 26 presents a high impedance source to the NFET gates, and is not influenced by the high frequency transients; rather GVPS 26 tends to track low frequency changes in the output voltage on line 34, providing a very stable source-follower drive configuration. Thus, the low AC impedance to ground established by capacitor 60 provides a sink for the NFET gate charges to limit shoot-through while the gate discharge transistor 88 turns on to rapidly discharge the NFET gates for quickly transitioning the NFETs 46–49 from fully enhanced operation to linear operation for controlled suppression of the detected over-voltage.

In the illustrated embodiment, OVPC 22 also includes a low current power path 40 that supplies operating voltage to continuously powered electrical loads including ECM 24 and GVPS 26. The low current path 40 includes a P-channel MOSFET (PFET) 44, a gate discharge amplifier 54 that biases PFET 44 to a fully enhanced mode so long as the operating voltage is below a predetermined threshold, and an over-voltage regulation circuit 72 that reduces the PFET conduction during a detected over-voltage condition. The source of PFET 44 is coupled to input line 20 through a low impedance resistor 92, and the drain of PFET 44 is coupled directly to output line 34. The gate discharge amplifier 54 includes the series combination of resistors 94 and 138, reverse voltage protection diode 124, and constant current sink circuit 96, which couple the gate of PFET 44 to ground potential. Tile circuit 96 sinks a small and substantially constant current, such as 2 mA, to maintain PFET 44 in the fully enhanced mode during normal operation, and the zener diode 128 prevents the source-to-gate voltage from exceeding a predetermined value such as 13V. The gate discharge amplifier 54 additionally includes a gate discharge transistor 90 having an emitter coupled to input line 20 and to the source of PFET 44 via resistor 92. The collector of transistor 90 is coupled to the junction between resistor 94 and diode 124, and the base of transistor 90 is coupled to the over-voltage regulation circuit 72 via resistor 100 and reverse voltage protection diode 122. The resistor 102 and the series combination of resistor 104 and capacitor 106 are also coupled to the base of transistor 90, and provide voltage feedback and compensation for improved stability during its linear operation. The over-voltage regulation circuit 72, like over-voltage regulation circuit 59, is responsive to the voltage at node 70, and includes a transistor 80 having its base coupled to node 70 via resistor 76. The emitter-collector circuit of transistor 80 couples the gate discharge amplifier 54 to ground through resistors 100 and 78, biasing transistor 90 into conduction in relation to the degree to which the output voltage on line 34 exceeds the breakdown voltage of Zener diode 64 and the forward voltage drop of diode 66. The transistor 90, in turn, operates to discharge the gate-to-source capacitance of PFET 44, driving PFET 44 into its linear operating region to suppress the detected over-voltage. Preferably, the over-voltage regulation circuits 59 and 72 are configured such that the over-voltage regulation circuit 59 has a higher voltage regulation set point than the over-voltage regulation circuit 72; consequently, the over-voltage protection is actually accomplished by the high current power path 42.

The operation of the high current power path will now be described in the context of both normal and over-voltage conditions. During periods of vehicle activity (signaled in the illustrated embodiment by closure of ignition switch 32), the ECM 24 activates GVPS via line 30 to supply a boosted gate drive voltage on line 28. This biases NFETs 46–49 to a fully enhanced state through input resistor 58 and gate resistors 110–113, providing a high current capability, low on-resistance, path through which alternator 10 and/or battery 18 can supply current to electrical loads 36. If an over-voltage on line 34 occurs during this condition (due to jump-starting or load-dump, for example), the transistor 88 is biased into conduction, biasing NFETs 46–49 into a limited conduction (i.e., linear) mode to limit the voltage seen by the loads 24, 26, 36 on line 34 to a value (such as 34V, for example) determined by the over-voltage regulation circuit 59. When the over-voltage condition is terminated, the transistor 88 returns to a non-coniductive state, and GVPS 26 returns the NFETs 46–49 to the fully enhanced state.

In summary, the over-voltage protection apparatus of the present invention provides a simple and effective expedient for protecting electrical load devices from damage due to over-voltage, and addresses the conflicting requirements of providing a high current, low on-resistance path for high current electrical loads during normal operation, while exhibiting fast response to transient over-voltages to prevent over-voltage shoot-through to the electrical load. While described in reference to the illustrated embodiment, it is expected that various modifications in addition to those mentioned above will occur to persons skilled in the art. For example, GVPS 26 may be directly connected to battery 18 if desired, and a signal other that ignition key-on can be used to activate GVPS 26. Additionally, tile high current power path 42 can be used without the low current power path 40, and so on. Accordingly, it should be understood that protection circuits incorporating such modifications may fall within the scope of this invention, which is defined by the appended claims.

What is claimed is:

1. A series-pass over-voltage protection circuit for supplying operating voltage to a high current electrical load from a DC voltage supply that is subject to transient over-voltage, comprising:
   - at least one N-channel MOSFET (NFET) having a drain coupled to a positive terminal of said voltage supply, a source coupled to said electrical load, and a gate, said NFET having intrinsic capacitances coupling said gate to said drain and to said source;
   - a gate voltage power supply for supplying a bias voltage to said gate for biasing said NFET to a fully enhanced state;
   - a gate discharge amplifier including a high current capability gate discharge transistor coupled between said gate and the negative terminal of said voltage supply that is activated to transition said NFET from said fully enhanced state to a linear state in response to excessive operating voltage; and
   - a compensation network coupled between said gate and the negative terminal of said voltage supply including a capacitor having a capacitance that is high relative to said intrinsic capacitances such that transient over-voltages at said drain and said source do not produce corresponding voltage increases at said gate, minimizing shoot-through of said transient over-voltage to said electrical load while said gate discharge transistor is activated in response to the excessive operating voltage.

2. The over-voltage protection circuit of claim 1, wherein said compensation network additionally includes a resistor connected in series with said capacitor to provide stability enhancement for said gate discharge amplifier.

3. The over-voltage protection circuit of claim 1, wherein said gate voltage power supply develops said bias voltage based on said operating voltage.

4. The over-voltage protection circuit of claim 1, including a plurality of NFETs, each having a drain coupled to the positive terminal of said voltage supply, a source coupled to said electrical load, a gate, and intrinsic capacitances coupling each such gate to a respective drain and a respective source.

5. The over-voltage protection circuit of claim 4, wherein the capacitor of said compensation network has a capacitance that is high relative to said intrinsic capacitances such that transient over-voltages at said drains and said sources do not produce corresponding voltage increases at said gates, minimizing shoot-through of said transient over-voltage to said electrical load while said gate discharge transistor is activated in response to the excessive operating voltage.

6. The over-voltage protection circuit of claim 1, wherein said gate discharge transistor operates when activated to sink current from said gate in relation to an amount by which said operating voltage exceeds a threshold voltage.

7. The over-voltage protection circuit of claim 1, wherein said electrical load is part of a motor vehicle electrical system, and the DC voltage supply includes a storage battery and an engine-driven alternator, and is subject to transient over-voltage due to battery jumping and alternator load-dumping.

* * * * *